United States Patent
Tzeng

(10) Patent No.: US 7,904,584 B2
(45) Date of Patent: Mar. 8, 2011

(54) SOURCE IDENTIFIER-BASED TRUNKING FOR SYSTEMS OF NETWORK DEVICES

(75) Inventor: Shrjie Tzeng, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 1002 days.

(21) Appl. No.: 10/776,531

(22) Filed: Feb. 12, 2004

(65) Prior Publication Data

US 2005/0198297 A1    Sep. 8, 2005

(51) Int. Cl.
    *G06F 15/16* (2006.01)
(52) U.S. Cl. ......... 709/236; 370/355; 370/389; 398/43
(58) Field of Classification Search .......... 709/236, 709/250
    See application file for complete search history.

(56) References Cited

U.S. PATENT DOCUMENTS

| | | | |
|---|---|---|---|
| 4,701,906 A * | 10/1987 | Ransom et al. | 370/355 |
| 5,524,254 A | 6/1996 | Morgan et al. | |
| 5,898,687 A | 4/1999 | Harriman et al. | |
| 5,918,074 A | 6/1999 | Wright et al. | |
| 6,185,185 B1 | 2/2001 | Bass et al. | |
| 6,425,015 B1 | 7/2002 | Jennings et al. | |
| 2002/0027908 A1 * | 3/2002 | Kalkunte et al. | 370/389 |
| 2003/0016624 A1 * | 1/2003 | Bare | 370/217 |
| 2005/0105904 A1 * | 5/2005 | Varanasi et al. | 398/43 |

FOREIGN PATENT DOCUMENTS

| | | |
|---|---|---|
| EP | 0312917 A2 | 4/1989 |
| EP | 0465090 A1 | 1/1992 |
| EP | 0859492 A2 | 8/1998 |
| WO | WO 99/00950 | 1/1999 |

* cited by examiner

*Primary Examiner* — Vivek Srivastava
*Assistant Examiner* — Vivek Krishnan

(57) ABSTRACT

A method of handling frames in a network device is disclosed. The steps include receiving a frame by a network device of an assembly of network devices, with the assembly of devices divided into a first side and a second side and the network device being on the first side, examining the received frame to determine whether the frame is destined for a member of a specific trunking group, determining whether a destination device identifier for the frame corresponds to one of the network devices on the second side and forwarding the frame to a destination port based on the specific trunk group membership and the destination device identifier.

15 Claims, 4 Drawing Sheets

SOURCE IDENTIFIER-BASED TRUNKING FOR SYSTEMS OF NETWORK DEVICES

BACKGROUND OF THE INVENTION

1. Field of the Invention

The present invention relates to devices, software applications and networks that utilize data that is sent or received over data communication or computer networks. In particular, the present invention is directed to methods and apparatuses for handling the flows of datagrams through a system of network devices. The processor and methods described provide the ability to control the selection of ports of a trunking group is achieve better performance and reduce worst case latency.

2. Description of Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology.

Based upon the Open Systems Interconnect (OSI) 7-layer reference model, network capabilities have grown through the development of repeaters, bridges, routers, and, switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which MAC (media access controller) addresses exist on which ports of the bridge, and pass packets that are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In addition, the utility of network devices can be increased in certain environments by connecting the network devices into an arrangement where the multiple network devices are utilized like a single device. For example, a network having 14 ports may be arranged with another of the same type of network device to provide a 28 port solution. Another aspect of network devices are often exploited are the ability to "trunk" ports together to form a single logical port. Port trunking is a mechanism to bundle ports together to form what is called a trunk. Port trunking is like a logic link and is used when one requires higher bandwidth and/or redundancy between switches. In some devices, a user can bundle up to 8 ports together to service this purpose.

Since the bundled ports are treated as a logic link, an algorithm is needed to determine which port to send the frame to when there is a frame destined for the trunk group. The basic operation method is whenever a network device processes a frame that is destined for any member of a trunking group, it needs to re-calculate which port of the corresponding trunking group will be used to relay this frame. For example, the process may be employed at the destination address lookup phase for the processing of the frame. The network device may find that a current frame is destined for port A. Also, the network device knows port A is actually part of a trunking group. Then, the network device needs to figure out, based on some calculation process, which member of the corresponding trunking group will be the final destination for this frame. In many environments, this is accomplished by obtaining a trunking hash result. The decision can be any member within the corresponding trunking group.

There are six trunking hash algorithms that are widely used in the industry. They are Source Address (SA) based, Destination Address (DA) based, {SA, DA} based, source Internet Protocol (IP) based, destination IP based and {source IP, destination IP} based scheme. Take SA based trunking hash algorithm as an example, where the network device will use SA as the key to a hash function. Based on the hash result, the network device will do a lookup on the trunking member and then chose one of the trunking members to be the final destination of the corresponding frame. The hash function is deliberately chosen so that it can provide random distribution no matter what input it is fed to. For a different trunking hash algorithm, the difference is occurs in what value is fed to the tunking hash. So, a {SA, DA} based trunking will use {SA, DA} as the key to a hash function, while source IP based trunking will use source IP as the key to a hash function.

In addition, there are some variations on these trunking hash algorithm that are also used. Basically, most of them go deeper into the frame and get more information from higher layer protocol. This is done under the belief that with more information from the frame, the frames can be distributed within a trunking group in a more clever fashion. This is done so that the performance of the whole system can be improved. However, the more complex the scheme, the greater the overhead and eventually a state of diminished returns is reached. What is needed and what is missing from the prior art is a simple method that will allow for greater equity between ports of a trunk group without requiring greater complexity.

SUMMARY OF THE INVENTION

According to one embodiment of the invention, a method of handling frames in a network device is disclosed. The steps include receiving a frame by a network device of an assembly of network devices, with the assembly of devices divided into a first side and a second side and the network device being on the first side, examining the received frame to determine whether the frame is destined for a member of a specific trunking group, determining whether a destination device identifier for the frame corresponds to one of the network devices on the second side and forwarding the frame to a destination port based on the specific trunk group membership and the destination device identifier.

Additionally, the method may include examining the received frame to determine whether the frame is destined for the member of the specific trunking group of ports providing connections over a high speed data port interface. Also, the step of examining the received frame may include performing a lookup in a trunking group table.

Also, the step of determining whether the destination device identifier for the frame corresponds to one of the network devices on the second side may include examining the destination device identifier contained in a header of the frame. In addition, the step of forwarding the frame may include forwarding the frame over an interconnected Gigabit port of the network device when the specific trunk group membership and the destination device identifier indicate one of the network devices on the second side.

According to another embodiment, a network device for handling frames is disclosed. The device includes receiving means for receiving a frame by a network device of an assembly of network devices, with the assembly of devices divided into a first side and a second side and the network device being on the first side, examining means for examining the received frame to determine whether the frame is destined for a member of a specific trunking group, determining means for determining whether a destination device identifier for the frame corresponds to one of the network devices on the second side and forwarding means for forwarding the frame to a destination port based on the specific trunk group membership and the destination device identifier.

According to another embodiment, a network device for handling frames is disclosed. The device includes a plurality of ports, configured to send and receive data frames, with at least one of the ports connected to other network devices of an assembly of network devices, with the assembly of devices divided into a first side and a second side and the network device being on the first side and at least one port interface, for coordinating the actions of the plurality of ports. The at least one port interface is configured to examine the received data frames to determine whether the frame is destined for a member of a specific trunking group and whether a destination device identifier for the frame corresponds to one of the network devices on the second side. Additionally, the at least one port interface is configured to forward the frame to a destination port based on the specific trunk group membership and the destination device identifier.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

The present invention is directed, in one embodiment, to a network device that receives data and processes that data and that may forward that data onto a destination based on attributes of that data. The present invention provides a simple way, without requiring information that is found by going further into frame, to achieve greater balance between ports of the trunk group and to provide better performance of the network device. The present invention may be best understood through the following examples and discussion.

Figure 1:
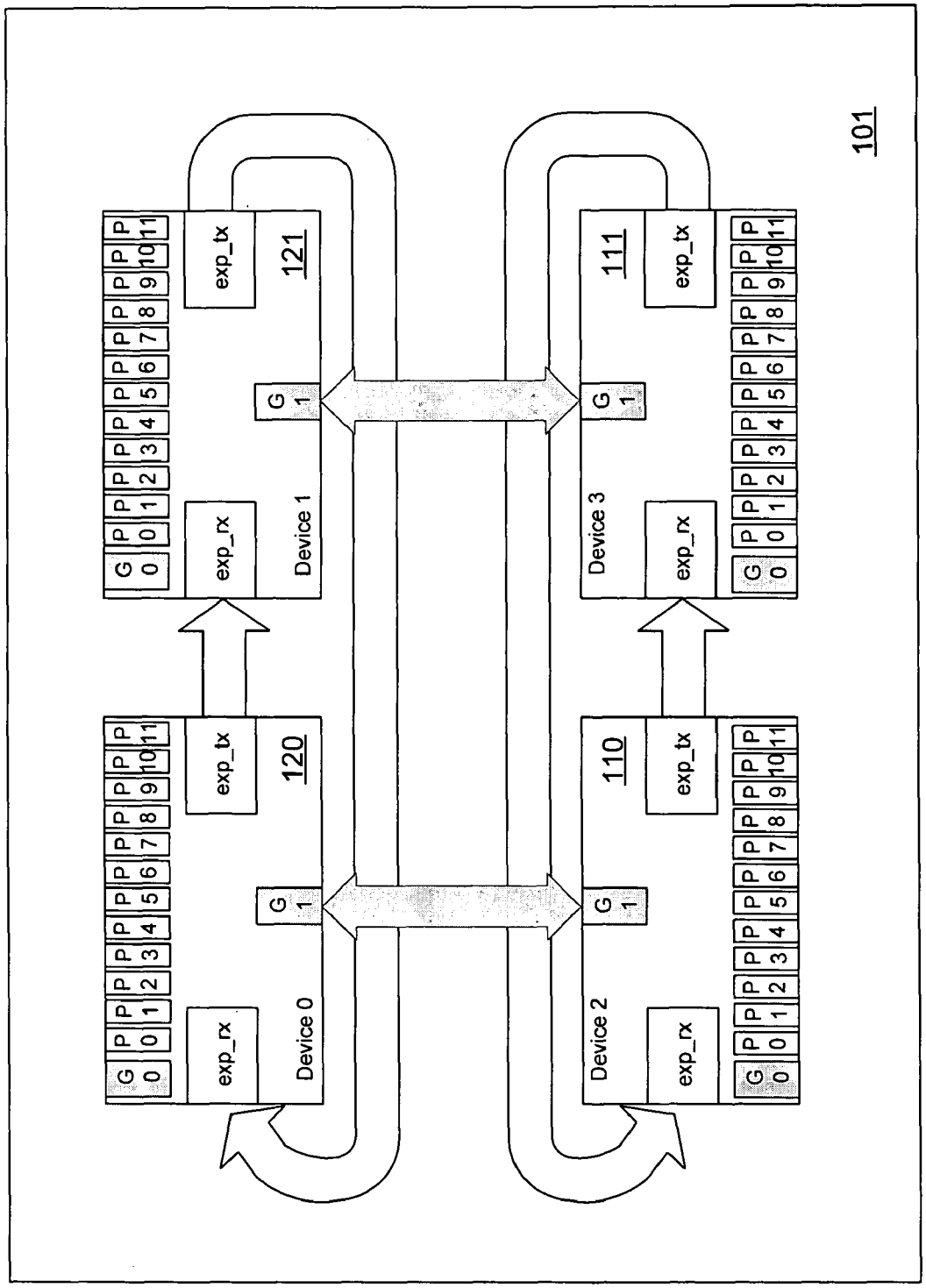
FIG. 1 illustrates a system of network devices, according to one embodiment of the present invention.
Figure 2:
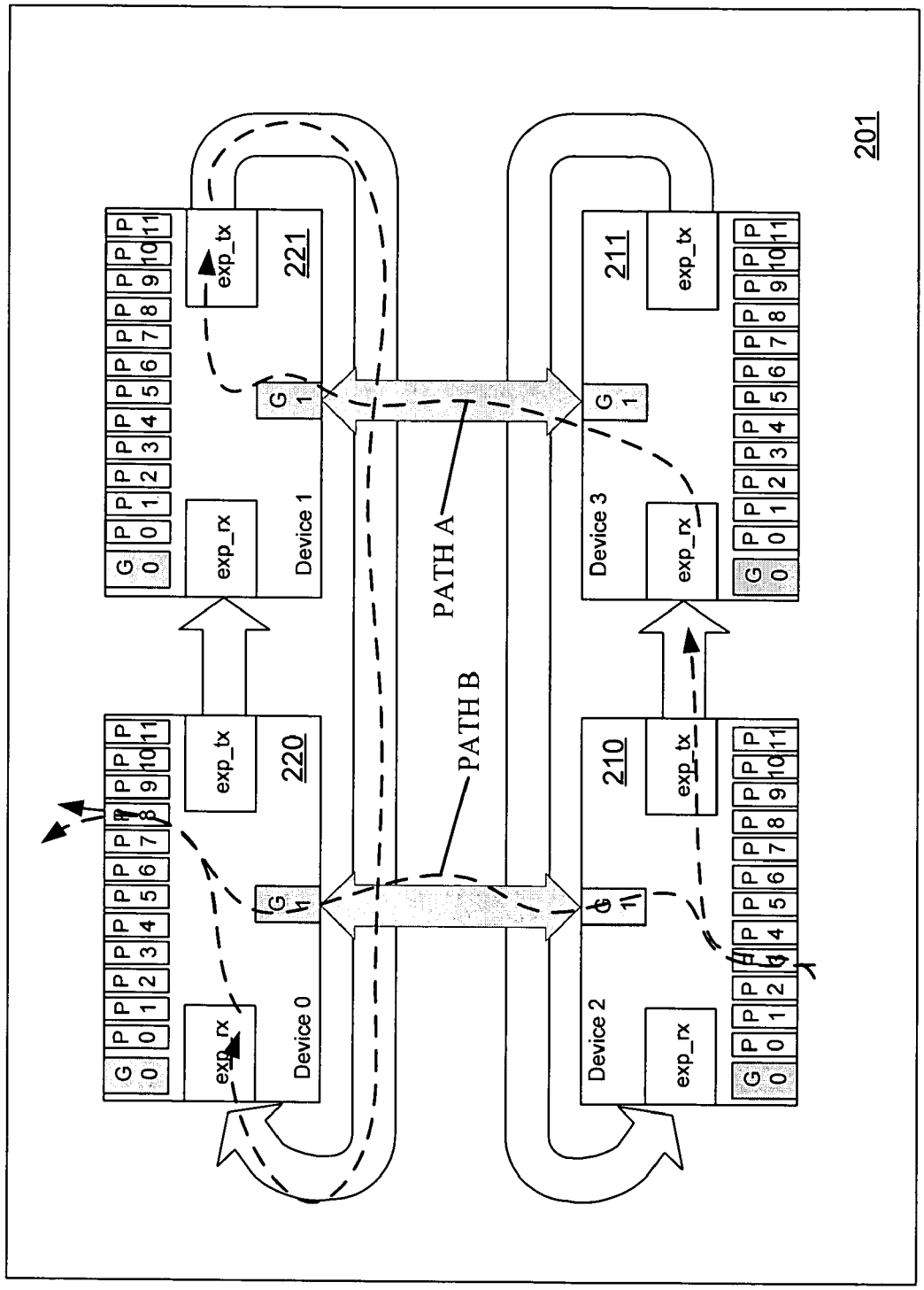
FIG. 2 illustrates a system of network devices with indicated paths for handling of datagrams, according to one embodiment of the present invention.
Figure 3:
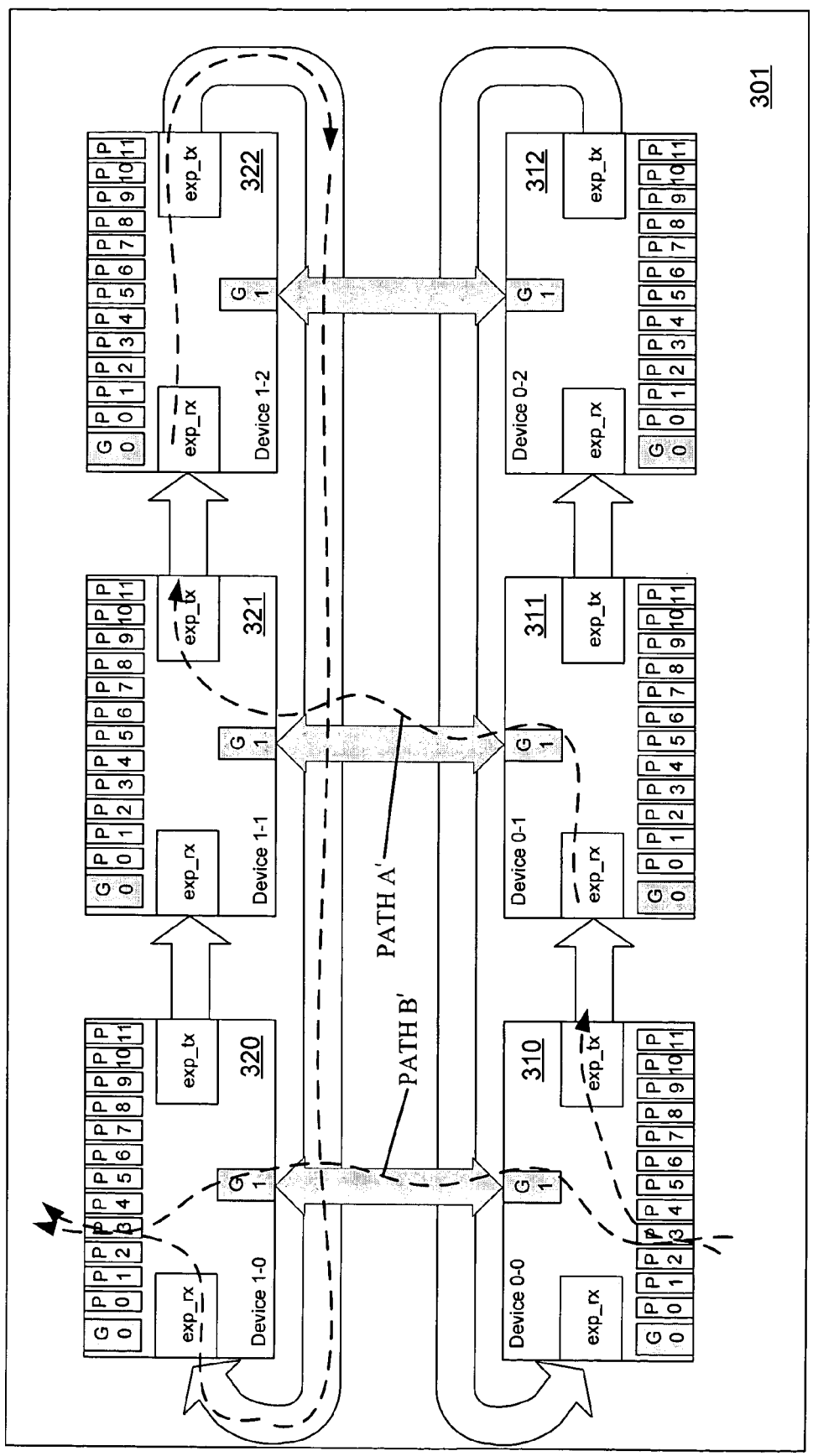
FIG. 3 illustrates another system of network devices with indicated paths for handling of datagrams, according to one embodiment of the present invention.

According to one embodiment, the network device may be a 12+2 fast Ethernet switch. Referring to FIGS. 1-3, such a network device provides 12 fast Ethernet ports, P0-P11 and 2 Gigabitbit Ethernet ports, G0 and G1. In one example, each port or series of ports is supported by a port interface, which allows for frames to be sent and received, as well as allowing for frames to be forwarded to their destination ports on the network device or assembly of devices. A Gigabit port has a capacity of at least a Gigabit per second with other ports having throughputs of at least 10/100 Mbps, in many embodiments. Via a trunking feature on Gigabit ports, as illustrated in FIG. 1, a user can build a 48+4 system in a cost effective fashion. That is, the assembly 101 is composed of devices 110, 111, 120 and 121, where devices 110 and 111 are in an upper portion and devices 120 and 121 are in a lower portion. The network device are in communication through the Gigabit ports G1 on all of the network devices and through expansion ports, exp_rx and exp_tx. The expansion ports connect network devices on a same side of the assembly, i.e. devices 210 and 211 are connected through the expansion ports, and devices on opposite sides of the assembly are connected through Gigabit ports.

In such an arrangement, the two Gigabit ports, G1s, on all network devices of the assembly, need to be accessed via trunking to avoid a loop being formed through the back plane between devices. Any loop in a switch system can cause a broadcast storm effect and can make a switch system fail to function. Setting up a trunking group on the two Gigabit ports on each of the upper and lower portions will make them a single logic link. Therefore, this will prevent the formation of a loop in the network device assembly. Also it provides twice as much bandwidth as Gigabit Ethernet between the upper portion of the system and the lower portion of the system. Through the usage of the assembly, it has become apparent that it is better to use two Gigabit ports than just use one Gigabit port as the link between the upper and lower portions of the system.

However, problems can occur in the above-discussed setup. One such problem is illustrated in FIG. 2, with devices 210-221 making up the device assembly 201. Since a trunking hash result can be used to determine which port to use to relay frames between upper portion of the system and lower portion of the system, the network device will pick either one of the two Gigabit ports depending on the different hash algorithm that is used.

No matter which one of these popular hash algorithms is used, it is possible that the forwarding of a frame will end up taking Path A, as illustrated in FIG. 2. As also illustrated in FIG. 2, the preferable path from P3 on device 2, 210, to P8 on device 0, 220, would be Path B. This is because trunking hash only takes into account frame content, but not the physical location of the switch system.

The present invention improves upon the forwarding of frame in such assemblies by also considering a Source chip Identifier (ID) to result in better system performance. According to at least one embodiment of the present invention, a trunking hash algorithm is used that is source chip ID based. This source chip ID based trunking is specifically designed only on those links that connect upper part of the system and lower part of the system. It is not recommended to be used in other trunking applications that do not have similar system requirements.

In this mode, the device no longer sends any key to any hash function. In actuality, it does not rely on a hash result at all. Additionally, the device does not do a "lookup" on the trunking member to choose one of the trunking members to be the final destination of the corresponding frame. Instead, it relies on the chip ID.

Whenever one of the network devices receives a frame at one of its ports that is destined for any member of this Gigabit trunking group, it checks the frame's destination chip ID. If it is destined for one of the network devices that sit on an opposite side of the system, the switch will use the receiving network device's Gigabit port 1, G1 in FIG. 2, as the destination port. With this scheme, the device will never utilize the Path A case for such a frame as described above, with its higher latency.

The present invention is not limited to the specific device embodiments discussed above. The present system can support greater numbers of devices connected in many different assemblies. Another embodiment is illustrated in FIG. 3, where three devices, devices 310-312, on the lower part and the other three devices, devices 320-322, on the upper part. As it is shown in FIG. 3, it becomes a 60+6 system. In this case, source chip ID based Gigabit trunking is set up on the three G1 ports. High port count systems are also possible and may utilize the trunking methods of the present invention similarly.

Figure 4:
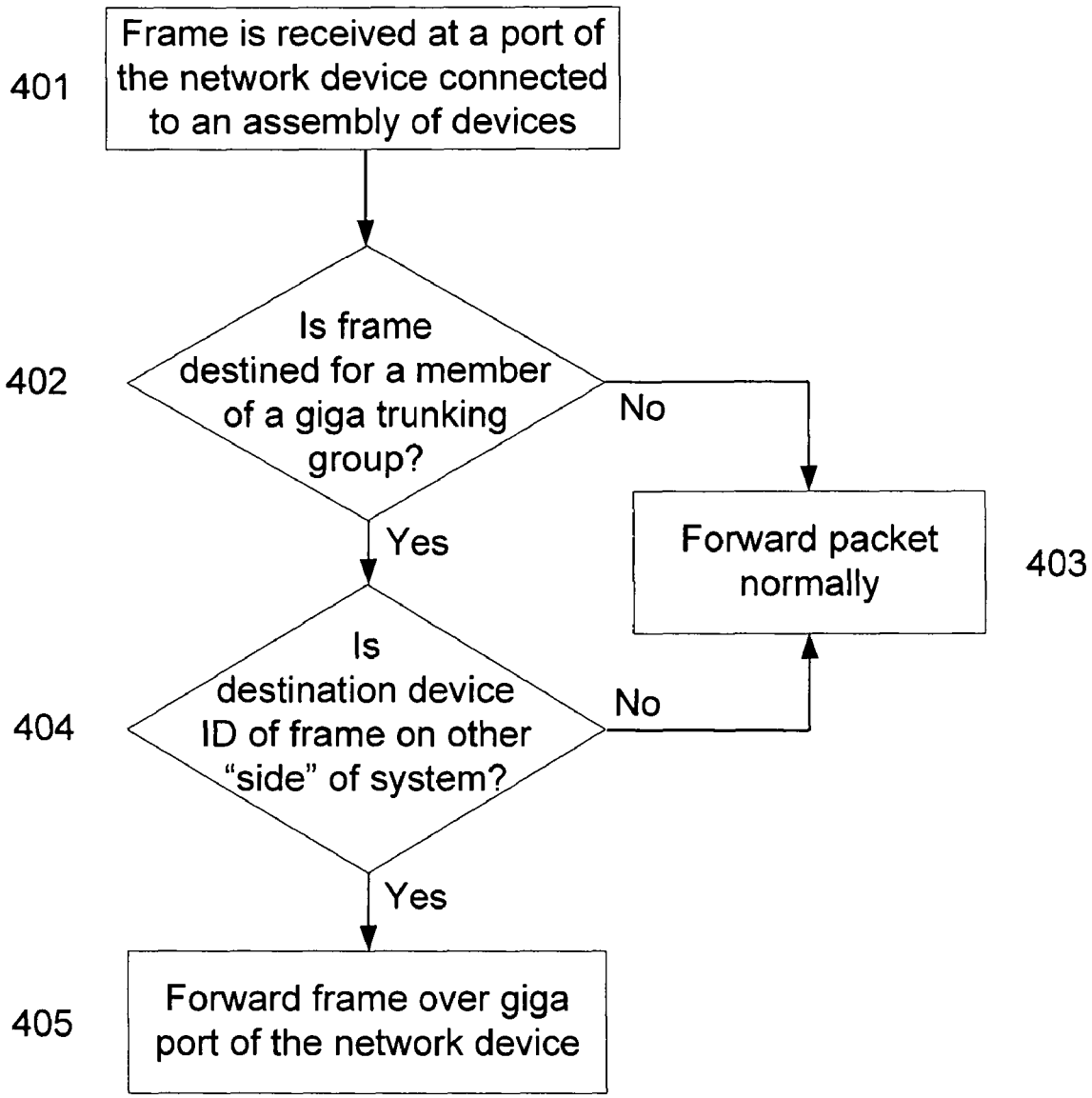
FIG. 4 illustrates a flow chart showing the process of handling packets by the system of network devices, according to one embodiment of the present invention.

The present invention is also illustrated in FIG. 4. FIG. 4 provides a flowchart of the methodology of the present invention, according to one embodiment. In step 401, a frame is received by a network device in an assembly of network device. The frame is parsed and it is determined, in step 402, whether the frame is destined for a member of the Gigabit trunking group. If it is not, then the flow proceeds to step 403 and the packet is forwarded as it would be normally. This "normal" frame handling might involve determined the destination port for the frame and forwarding the frame to a device that contains that port or would lead to that port. If the frame is destined for a member of the Gigabit trunking group, it is next determined, in step 404, whether the destination device ID is on the other side of the assembly. If it is not, then the flow again proceeds to step 403 and the packet is handled normally. If the frame is destined for a device on the "other side," then it is forwarded over the instant network device's own Gigabit port, in step 405, and avoids the longer, deleterious path.

One benefit of avoiding the Path A case is that it provides more bandwidth on the exp ports for greater flows of traffic. So, making good use of the limited bandwidth on expansion port can becomes important in systems employing multiple devices to form the assemblies. The source chip ID based trunking can improve the total system performance. Another benefit is the reduction in the worst case latency from three hops to two hops. Latency becomes more and more important many end users, where some end users require a device latency to be less than 2 ms. Adding one extra hop in worst case will push the assembly closer to any latency limitation boundary.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of handling frames, said method comprising:
receiving a frame at a first network device of an assembly of network devices divided into a first trunk group on a first side and a second trunk group on a second side, wherein the assembly includes a plurality of high-speed links connecting devices on the first side to corresponding devices on the second side, and wherein the first network device has a first high-speed port connected to a first high-speed link of the plurality of high-speed links and is on the first side and a member of the first trunk group, wherein the assembly of network devices include expansion ports connecting network devices located on a same side to each other;
determining, using the first network device, whether the frame is destined for a network device of the first trunk group or a second network device of the second trunk group;
if the frame is destined for the second network device, determining a path for forwarding the frame to the second side, the path being determined based on achieving a minimized forwarding latency for forwarding the frame to the second network device and including the first high-speed port of the first network device; and
if the frame is not destined for one of the network devices of the second trunk group, forwarding the frame from the first network device to a subsequent network device of the first side to which the frame is destined, via an expansion port of the expansion ports.

2. The method of claim 1 wherein the receiving comprises:
receiving the frame at the first network device, and wherein the plurality of links include a plurality of high speed links connecting a Gigabit port on a device of the first side to a Gigabit port on a device of the second side.

3. The method of claim 1 wherein the determining comprises:
determining, based on a source chip identifier in a header of the frame, whether the frame is destined for a network device of the first trunk group or the second trunk group.

4. The method of claim 1 wherein if the frame is destined for the second network device, the forwarding comprises:

determining that the first high-speed link is local to the first network device; and forwarding the frame from the first network device to the second network device via the first high-speed link.

5. The method of claim 1 wherein if the frame is not destined for a network device of the second side, the forwarding comprises:

forwarding the frame to the network device of the first side to which the frame is destined via one or more expansion links connecting the first device to the network device of the first side to which the frame is destined.

6. The method of claim 1, wherein if the frame is destined for the second network device, the forwarding comprises:

determining the path relative to an alternate path, the alternate path based on a hash algorithm used to select a high-speed link of the plurality of links.

7. A first network device for handling frames, comprising:

receiving means for receiving a frame at the first network device of an assembly of network devices of a trunk group divided into a first side and a second side, wherein the assembly includes a plurality of high-speed links connecting the first side to the second side, and wherein the first network device is on the first side and includes a first high-speed port connected to a first high-speed link of the plurality of high-speed links, wherein the assembly of network devices include expansion ports connecting network devices located on a same side to each other;

determining means for determining whether the frame is destined for a network device of the first side or a second network device of the second side; and forwarding means for forwarding, if the frame is destined for the second network device of the second side, the frame to the second side using a forwarding path determined based on achieving a minimized forwarding latency for forwarding the frame to the second network device and including the first high-speed port, and if the frame is not destined for one of the network devices of the second side, forwarding the frame from the first network device to a subsequent network device of the first side to which the frame is destined, via an expansion port of the expansion ports.

8. The first network device as recited in claim 7, wherein the forwarding means comprises means for forwarding, if the frame is destined for the second network device of the second side, the frame via the first high-speed link to a third network device of the second side, and forwarding the frame to the second device of the second side via one or more expansion links connecting the third device to the second device.

9. The first network device as recited in claim 7, wherein the forwarding means comprises means for forwarding, if the frame is destined for the second network device of the second side, the frame via the first high-speed link to the second network device wherein the first high-speed link is local to both the first network device and the second network device.

10. The first network device as recited in claim 7, wherein the forwarding means comprises means for forwarding, if the frame is not destined for one of the network devices of the second side, the frame from the first network device to the network device of the first side to which the frame is destined via one or more expansion links.

11. A network device configured to:

receive a frame, the network device being a member of a first trunk group on a first side of an assembly of network devices and including a first high-speed port of a plurality of high-speed ports;

determine whether the frame is destined for a first device of the first trunk group on the first side of the assembly, or for a second network device that is a member of a second trunk group on a second side of the assembly, wherein the assembly of network devices include expansion ports connecting network devices located on a same side to each other, and wherein the plurality of high-speed ports connect network devices on different sides, and wherein the high-speed ports have a higher transfer rate than the expansion ports; wherein if the frame is destined for the second network device of the second side, the network device is configured to forward the frame to the second side using a forwarding path determined based on achieving a minimized forwarding latency for forwarding the frame to the second network device and including a high-speed port connecting the first side to the second side, and if the frame is not destined for the second network devices of the second side, the network device is configured to forward the frame from the first network device to a subsequent network device of the first side to which the frame is destined, via an expansion port of the expansion ports.

12. The network device of claim 11 wherein the high-speed ports are Gigabit ports.

13. The network device of claim 11 wherein the network device configured to determine the path is configured to determine how to forward the packet to the second network device based on a physical location of the network device relative to the second network device.

14. The network device of claim 11 wherein the network device is configured to determine that the frame is destined for the second network device based on a source chip identifier of the frame.

15. The network device of claim 11 wherein the network device does not rely on a hash result to determine the path.

* * * * *